(12) United States Patent  (10) Patent No.: US 9,056,727 B2
White et al.  (45) Date of Patent: Jun. 16, 2015

(54) MULTI-PIECE SHAFT

(71) Applicant: Joy MM Delaware, Inc., Wilmington, DE (US)

(72) Inventors: David R. White, Fayette, AL (US); Todd W. Kirkpatrick, Winfield, AL (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 14/158,474

(22) Filed: Jan. 17, 2014

(65) Prior Publication Data

US 2014/0202823 A1  Jul. 24, 2014

Related U.S. Application Data

(60) Provisional application No. 61/754,122, filed on Jan. 18, 2013.

(51) Int. Cl.
 *B65G 39/12*  (2006.01)
 *B65G 39/02*  (2006.01)
 *B65G 15/08*  (2006.01)
 *B65G 39/09*  (2006.01)

(52) U.S. Cl.
 CPC ............... *B65G 39/12* (2013.01); *B65G 15/08* (2013.01); *B65G 39/09* (2013.01); *B65G 39/02* (2013.01)

(58) Field of Classification Search
 CPC ........ B65G 15/08; B65G 23/00; B65G 41/02; B65G 39/071; B65G 39/02; B65G 39/125; B61B 13/10

USPC ......... 198/808, 824, 825, 826, 828, 829, 830, 198/842; 193/35 R, 37, 35 J
See application file for complete search history.

(56) References Cited

U.S. PATENT DOCUMENTS

| | | | |
|---|---|---|---|
| 2,469,426 A | | 5/1949 | Anthony |
| 2,843,432 A | | 7/1958 | Kindig |
| 3,259,227 A | | 7/1966 | Steinmetz |
| 3,656,607 A | * | 4/1972 | Gorgei et al. .............. 198/861.4 |
| 3,657,779 A | | 4/1972 | Granberry |
| 3,892,306 A | | 7/1975 | Bertaud |
| 4,029,200 A | * | 6/1977 | Dillon ........................... 198/830 |
| 4,643,300 A | | 2/1987 | Morrison |
| 4,673,380 A | | 6/1987 | Wagner |
| 4,925,014 A | * | 5/1990 | Haite ............................ 198/780 |
| 5,022,132 A | * | 6/1991 | Valster et al. ................. 198/842 |

(Continued)

FOREIGN PATENT DOCUMENTS

EP  0112026 A1 *  6/1984  ...................... 193/37

OTHER PUBLICATIONS

PCT International Search Report and Written Opinion for PCT Application No. PCT/US2014/012098 dated May 14, 2014 (12 pages).

*Primary Examiner* — Mark A Deuble
(74) *Attorney, Agent, or Firm* — Michael Best & Friedrich LLP

(57) ABSTRACT

A multi-piece shaft for an idler roller including a tube having a first end and a second end. The shaft includes a first stub secured to the first end of the tube by a mechanical interlock and a second stub secured to the second end of the tube by a mechanical interlock. The first stub extends from the first end and the second stub extends from the second end when secured to the tube such that the tube, the first stub and the second stub define a length of the shaft.

18 Claims, 16 Drawing Sheets

(56) References Cited

U.S. PATENT DOCUMENTS

| | | |
|---|---|---|
| 5,117,970 A | 6/1992 | Gibbs |
| 5,865,290 A * | 2/1999 | Scott ............................. 193/37 |
| 6,082,528 A * | 7/2000 | Habberley ................... 198/842 |
| 6,516,942 B2 * | 2/2003 | East ............................ 198/830 |
| 7,028,825 B2 * | 4/2006 | Scott ............................. 193/37 |
| 8,146,733 B2 | 4/2012 | Fox |
| 8,225,926 B1 | 7/2012 | Anderson et al. |
| 2003/0015394 A1 * | 1/2003 | Nimmo et al. ................. 193/37 |
| 2003/0034222 A1 * | 2/2003 | Gamache ................. 193/35 TE |
| 2003/0183480 A1 * | 10/2003 | Dyson et al. .................... 193/37 |
| 2006/0175893 A1 * | 8/2006 | White et al. ................ 301/108.1 |

* cited by examiner

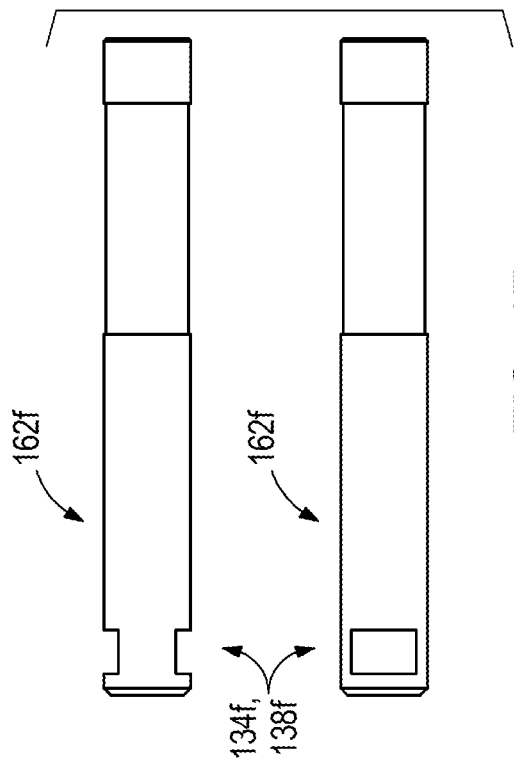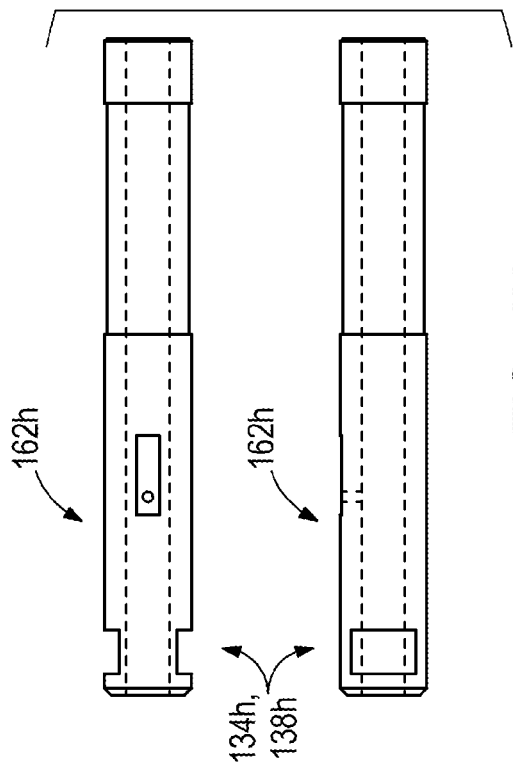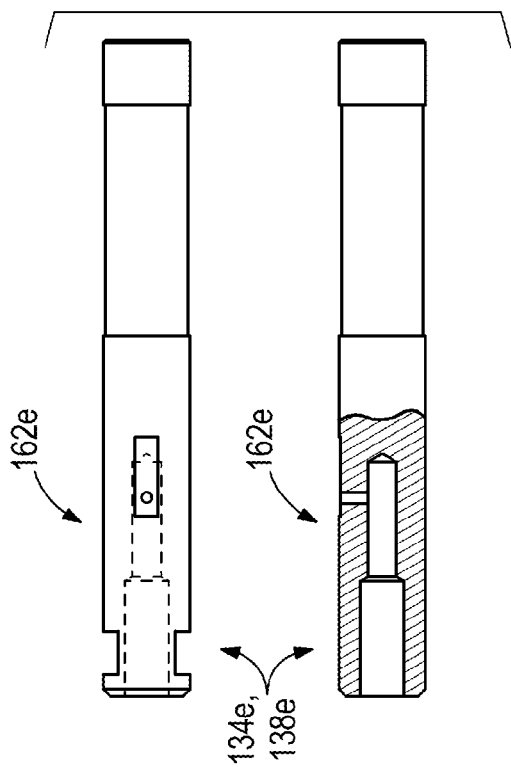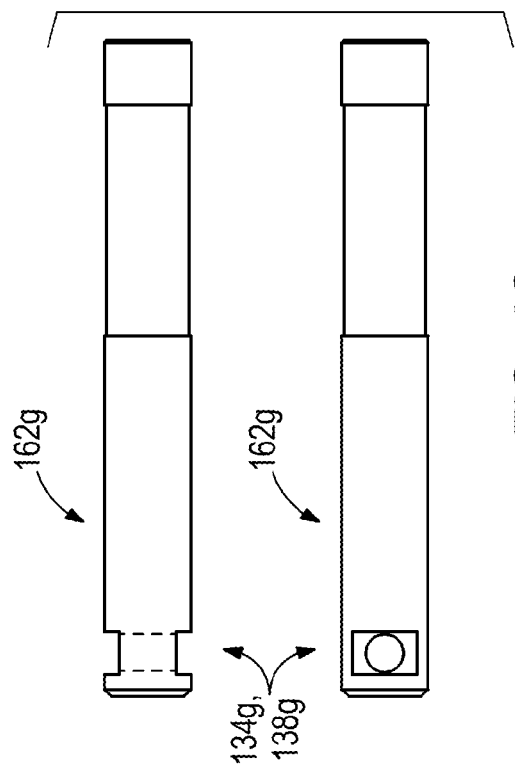
FIG. 4E
FIG. 4F
FIG. 4G
FIG. 4H

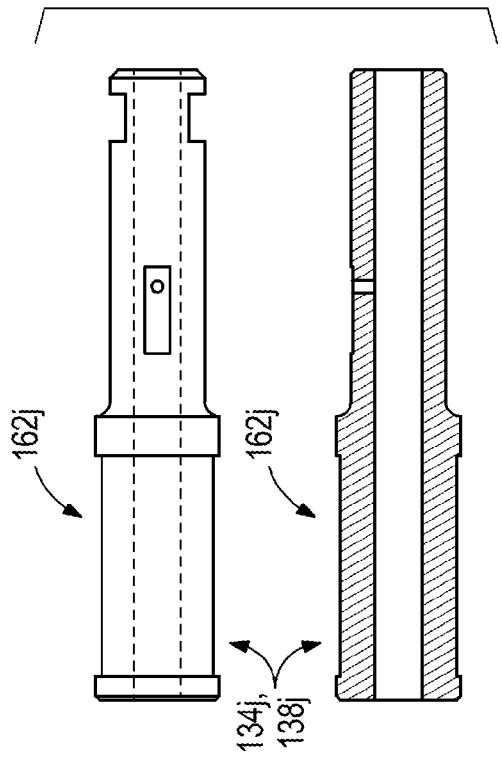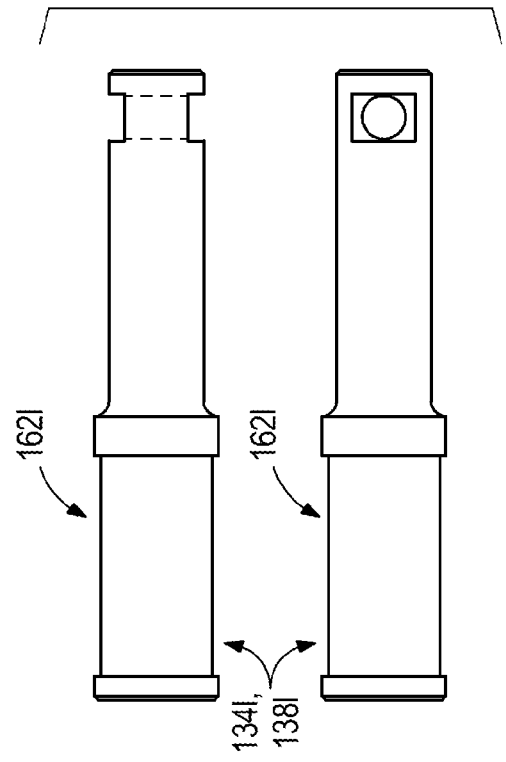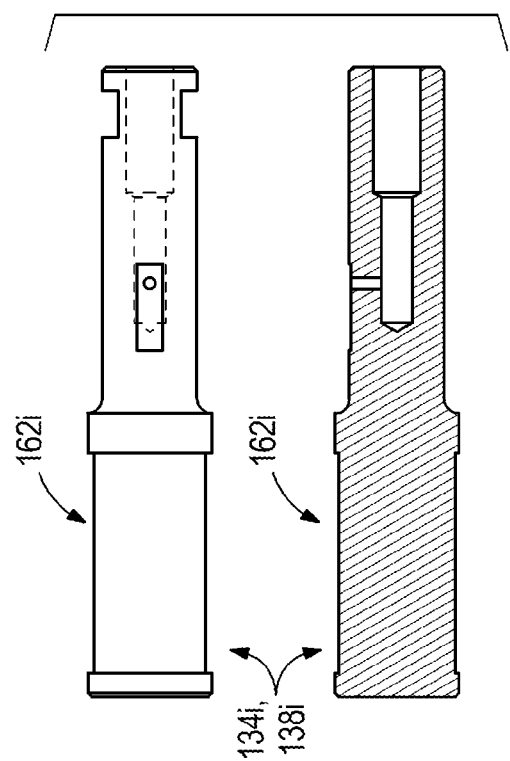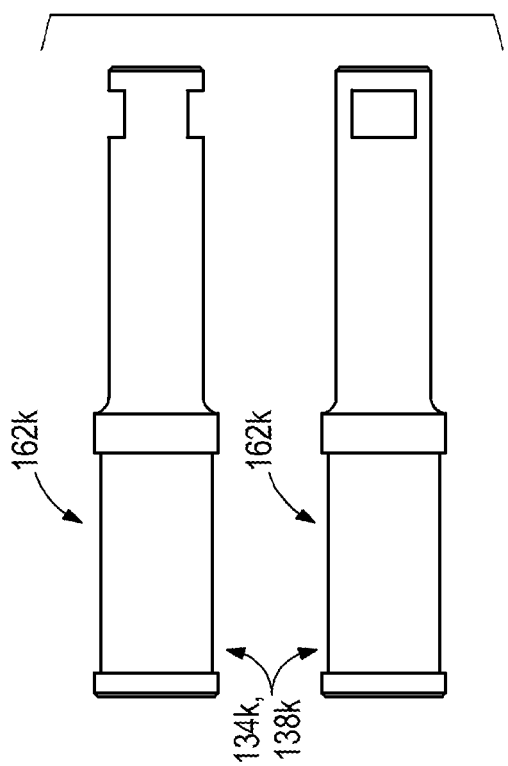

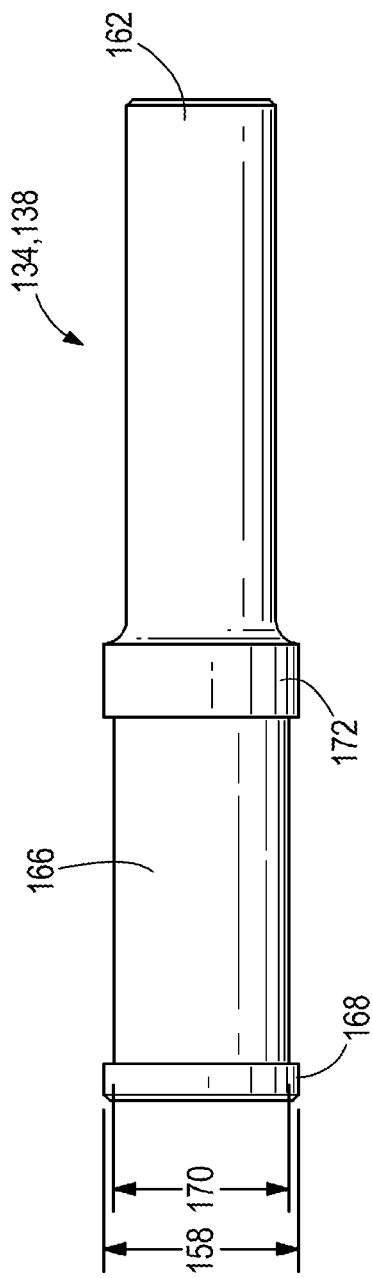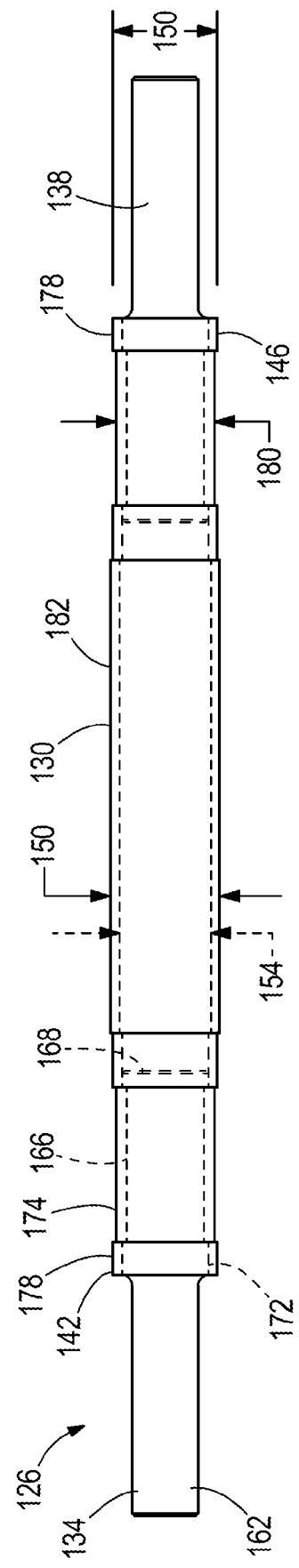
FIG. 5A
FIG. 5B

US 9,056,727 B2

MULTI-PIECE SHAFT

CROSS REFERENCE TO RELATED APPLICATIONS

This application claims priority to U.S. Provisional Application No. 61/754,122, filed Jan. 18, 2013, the entire contents of which are incorporated herein by reference.

BACKGROUND OF THE INVENTION

The present invention relates to idler rollers for conveyors, and in particular to a multi-piece shaft assembly for use with idler rollers.

Conveyors are used frequently in the mining industry for transporting large quantities of a substance. Conveyors typically include a conveyor belt that is advanced by a plurality of idler rollers. The idler rollers are supported by a frame and rotate about a shaft.

Idler roller assemblies often each include a unique shaft attachment configuration. Therefore, manufacturing a shaft is performed on dedicated equipment that makes it very expensive and difficult to manufacture alternate shaft types (e.g., shafts with a different length, diameter or end piece configuration). Adapters that enable one type of shaft to be inserted into an idler roller assembly that would otherwise accept a different type of shaft are expensive and therefore, not a cost effective solution.

SUMMARY OF THE INVENTION

In one embodiment, the invention provides a multi-piece shaft for an idler roller including a tube having a first end and a second end. The multi-piece shaft further includes a first stub secured to the first end of the tube by a mechanical interlock and a second stub secured to the second end of the tub by a mechanical interlock. Each stub includes a groove and an attachment configuration. The first stub extends from the first end and the second stub extends from the second end when secured to the tube such that the tube, the first stub and the second stub define a length of the shaft.

In another embodiment, the invention provides a multi-piece shaft for an idler roller including a tube having a first end and a second end. The shaft also includes a first stub and a second stub each defining a first diameter and including a groove and an attachment configuration. The groove defines a second diameter. The first stub is received in one of the first end or the second end of the tube and the second stub is received in the other of the first end or the second end of the tube. Each of the first stub and the second stub are secured to the tube by depressing the tube in an area of the grooves of the first stub and the second stub such that at least a portion of a diameter of the tube becomes substantially equal to the second diameter of the grooves that defines an inner diameter and an outer diameter.

In another embodiment an idler roller assembly includes a frame and a plurality of rollers supported by the frame. Additionally, a multi-piece shaft extends through each of the rollers. The multi-piece shaft includes a first stub secured to the first end of the tube by a mechanical interlock and a second stub secured to the second end of the tube by a mechanical interlock. The first stub extends from the first end and the second stub extends from the second end when secured to the tube such that the tube, the first stub and the second stub define a length of the shaft.

Other aspects of the invention will become apparent by consideration of the detailed description and accompanying drawings.

BRIEF DESCRIPTION OF THE DRAWINGS

FIGS. 5A, 5B, and 5C are side views of the multi-piece shaft illustrating the mechanical interlock between the tube and the first and second stubs.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION OF THE DRAWINGS

In another embodiment, the invention provides a multi-piece shaft for an idler roller including a tube having a first end and a second end. The multi-piece shaft further includes two stubs. Each stub includes a groove and an attachment configuration. The stubs are adapted to be received within one of the first or second ends of the tube. Each of the first stub and the second stub is secured relative to the tube (i.e., to the first end and the second end of the tube) by a mechanical interlock such that the attachment configuration protrudes from the first and second ends of the shaft. As such, the first stub extends from the first end and the second stub extends from the second end when secured to the tube such that the tube, the first stub and the second stub define a length of the shaft.

In another embodiment, the invention provides a multi-piece shaft for an idler roller including a tube having a first end and a second end, and defining an inner diameter and an outer diameter. The multi-piece shaft also includes a first cylindrical stub and a second cylindrical stub defining a first diameter. Each of the first and second stubs includes a notch or groove defining a second, smaller diameter and an attachment configuration. Each of the first and second ends receives one of the end pieces therein such that the tube overlays the notches. The tube is indented or depressed in the area of the notches such that at least a portion of the inner diameter of the tube becomes substantially equal to the second diameter of the notch. As such, the stubs are secured relative to the tube by a mechanical interlock.

In another embodiment, the invention provides an idler roller assembly including a frame, a plurality of roller supported by the frame, and a multi-piece shaft extending through each of the rollers. The multi-piece shaft includes a first stub secured to the first end of the tube by a mechanical interlock and a second stub secured to the second end of the tube by a mechanical interlock. The first stub extends from the first end and the second stub extends from the second end when secured to the tube such that the tube, the first stub and the second stub define a length of the shaft.

Figure 1:
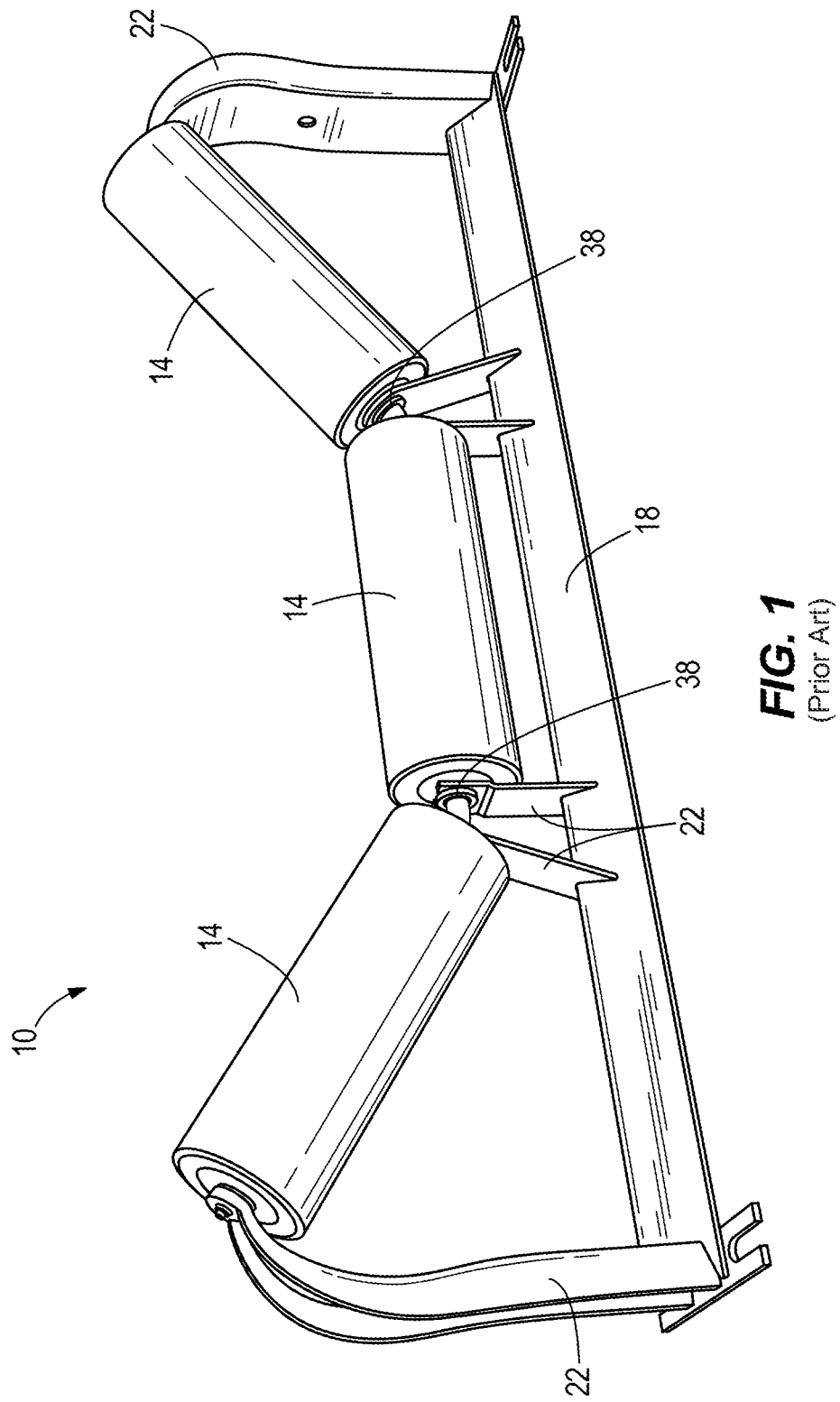
FIG. 1 is a perspective view of an idler roller system.
Figure 2:
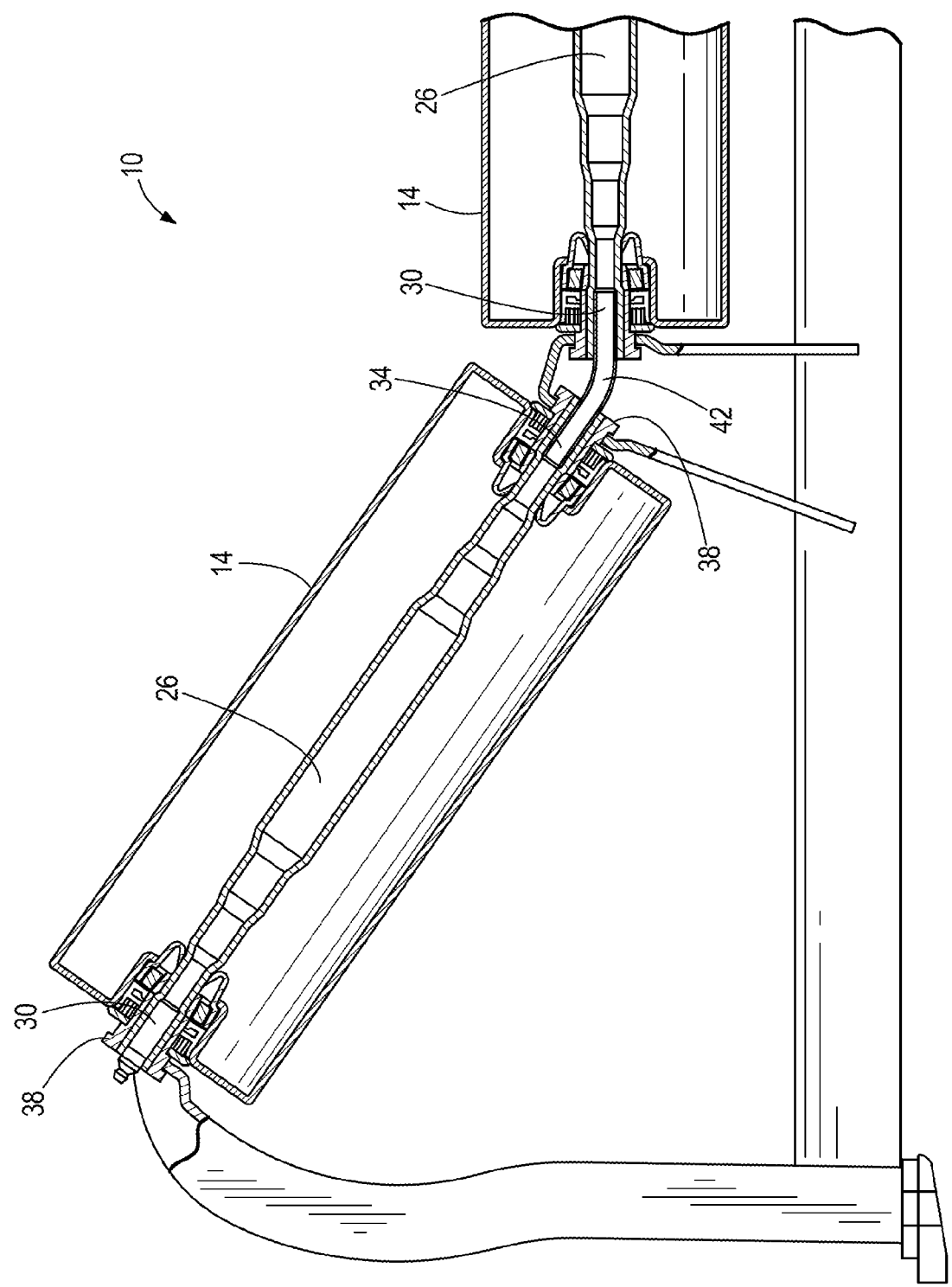
FIG. 2 is a cross-sectional view of an idler roller of FIG. 1, illustrating a shaft extending therethrough.
Figure 3:
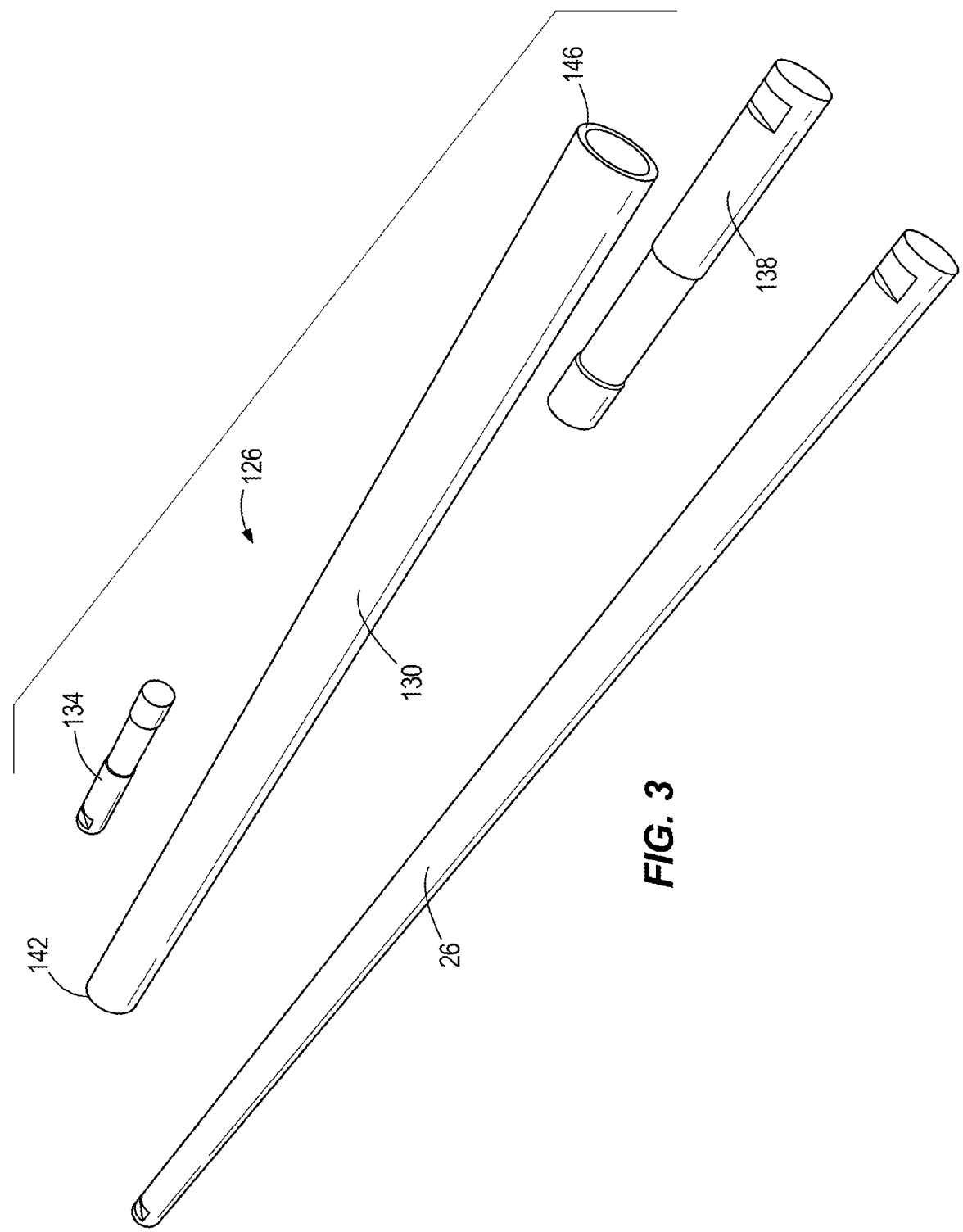
FIG. 3 is a perspective view of a multi-piece shaft according to one embodiment of the invention, the shaft including a tube and first and second stubs coupled thereto by a mechanical interlock.

FIGS. 1 and 2 illustrate an idler roller assembly 10 including a single piece shaft as is known in the art. The assembly includes idler rollers 14 that are supported by a frame 18 having vertically-oriented frame members 22. Each idler roller 14 includes a shaft 26 extending therethrough. Each shaft 26 includes threaded first and second ends 30, 34 that receive nuts 38. The nuts 38 include slots (not shown) that receive end portions of the respective frame member 22 thereby securing the first and second ends 30, 34 of the shaft 26 to the frame 18. The shafts 26 may be interconnected by flexible grease tubes 42 (FIG. 2), which allow grease to pass for lubrication of the rollers 14. The shafts 26 of conventional idler rollers 14 are integrally constructed and are therefore a single-piece.

FIGS. 3, 5A, 5B, 5C and 6 illustrate a multi-piece shaft 126 for use with an idler roller assembly 110 according to one embodiment of the invention. The multi-piece shaft 126 includes a tube 130, a first end piece or stub 134, and a second end piece or stub 138. In each embodiment illustrated herein, the first stub 134 and the second stub 138 are substantially identical to one another, although they may have a different configuration in other embodiments. The tube 130 includes a first end 142 and a second end 146, and defines an outer diameter 150 and an inner diameter 154. The stubs 134, 138 are sized and shaped to be received and secured within one of the first and second ends 142, 146 of the tube.

Figure 4:
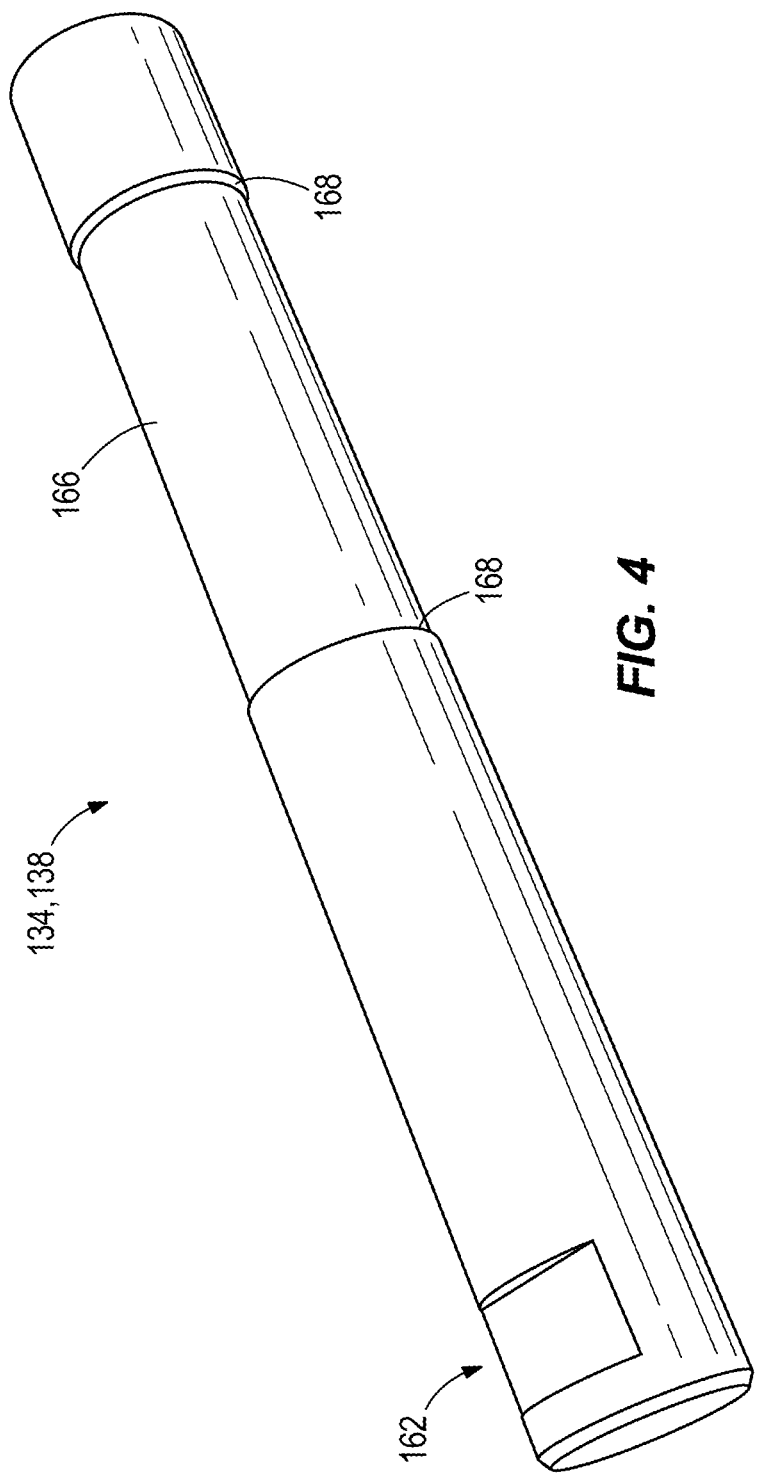
FIG. 4 is an enlarged view of the stub of FIG. 3.
Figure 4A:
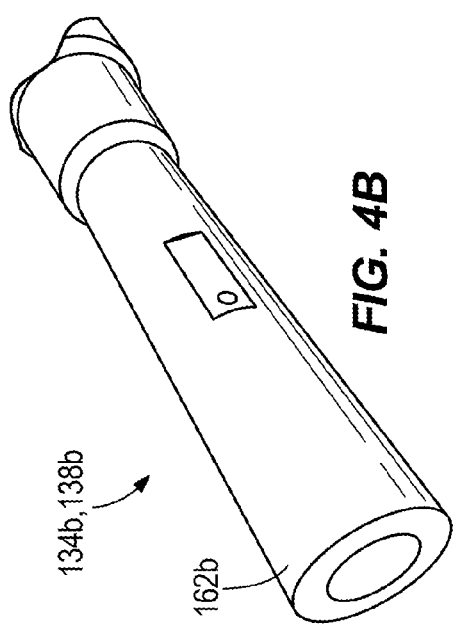
FIGS. 4A-4N are perspective views of a plurality of stubs, each of the plurality of stubs having a unique attachment configuration.
Figure 4B:
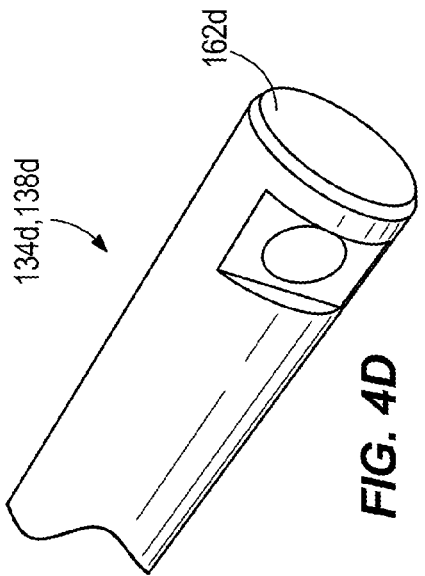
FIG. 4O is a perspective cross-sectional view of another stub that is used with the multi-piece shaft.
Figure 4C:
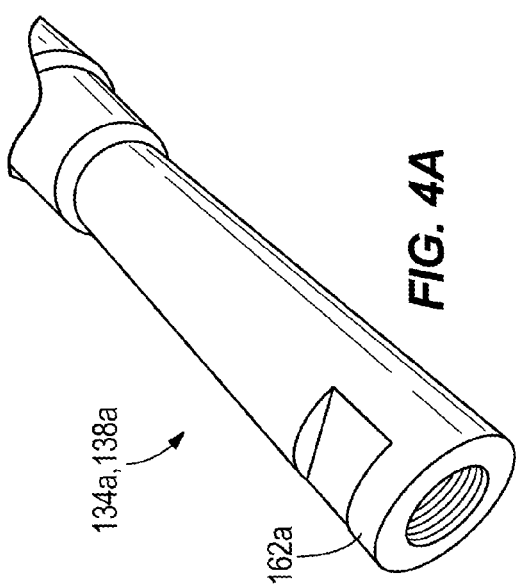
Figure 4D:
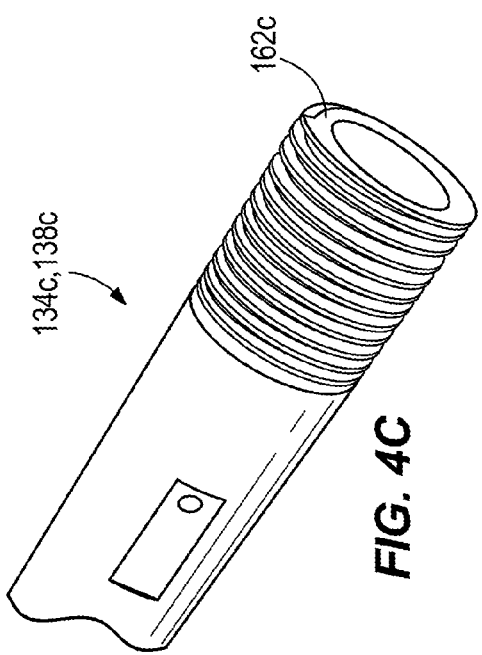

In the illustrated embodiment, the stubs 134, 138 are substantially cylindrical having a first, uniform diameter 158, although additional embodiments may include stubs 134, 138 having any suitable shape and the diameter may be non-uniform (i.e., one end may have a larger diameter than an opposite end). Referring to FIG. 4, each of the stubs 134, 138 includes an attachment end or portion 162 having an attachment configuration and an elongate recess or groove 166 that extends about a circumference of the stub 134, 138. The groove 166 is defined by flanges 168, 172. The groove 166 defines a second diameter 170, which is smaller than the diameter 158 of the stubs 134, 138. The tube 130 is mechanically interlocked (e.g., by mechanical crimping) to the first and second stubs 134, 138, thereby coupling the stubs 134, 138 to the tube 130. The process of mechanically interlocking the tube 130 to the stubs 134, 138 will be discussed in further detail below.

Figure 4M:
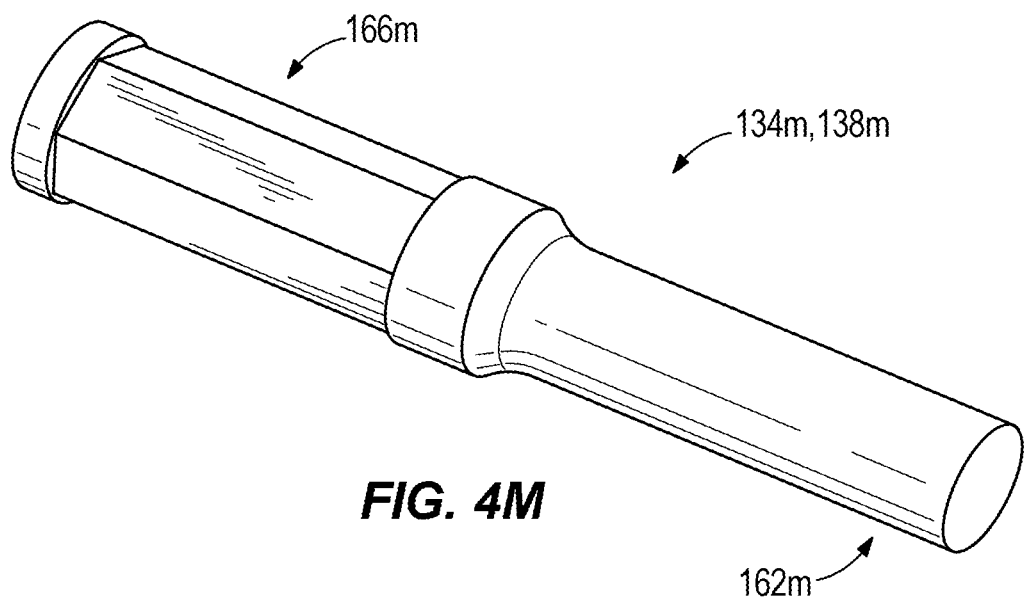
Figure 4N:
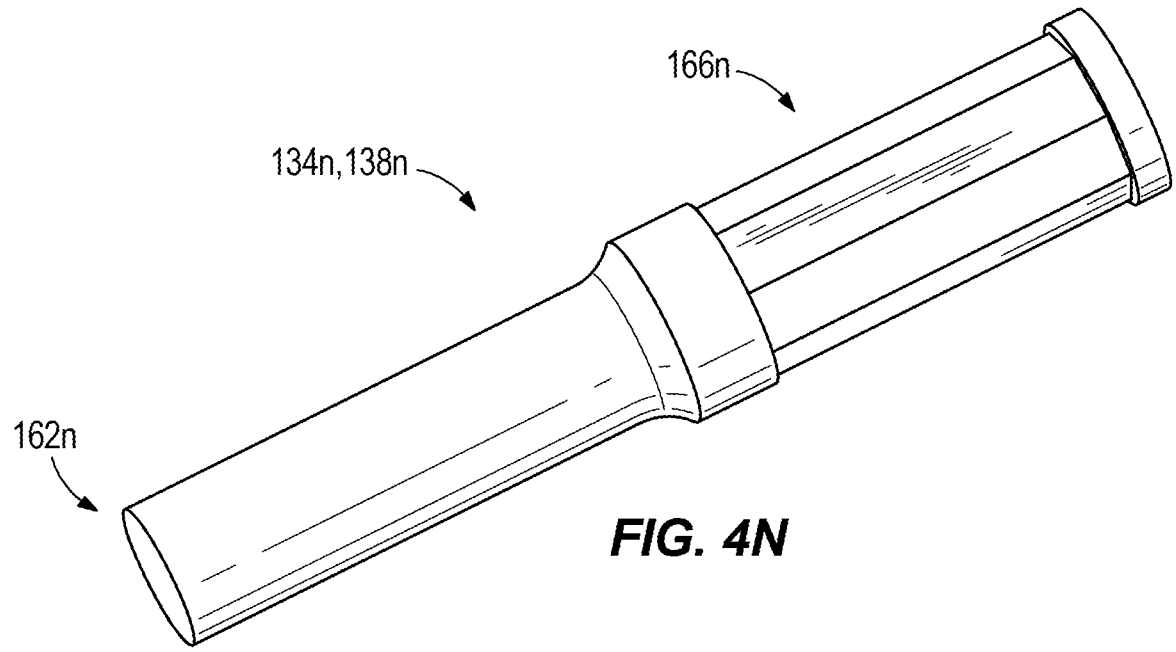
Figure 40:
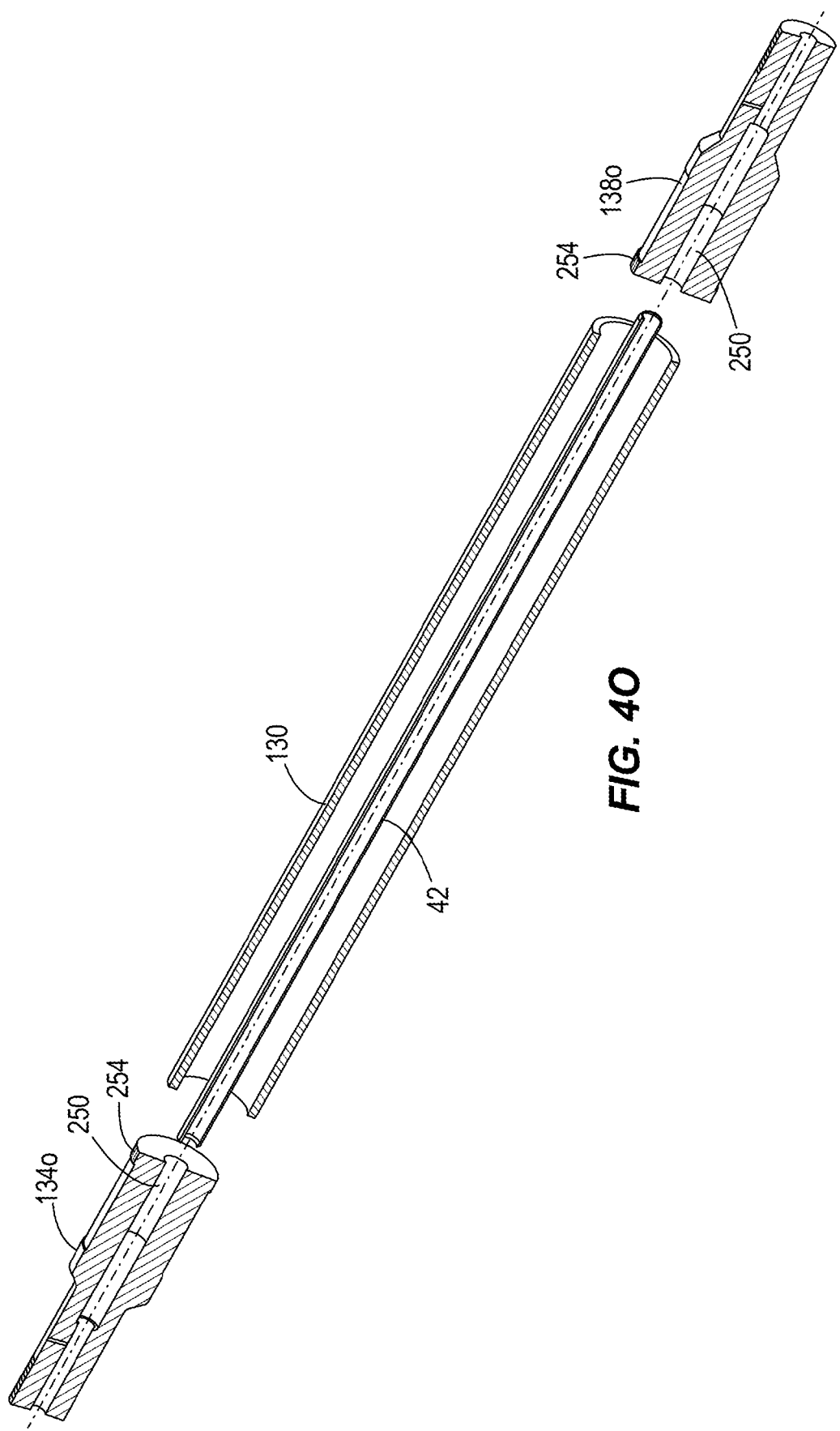

The stubs 134, 138 may have any suitable attachment end 162 having any suitable attachment configuration that is insertable within idler rollers 114 and compliant with any idler roller assembly 110. For example, FIGS. 4-4N illustrate a variety of stubs 134, 138, each having a unique attachment end 162-162n with unique attachment configurations. The wide variety of attachment configurations that the stubs 134, 138 may include allow any type of shaft 126 to be manufactured. Additionally, the grooves 166 may also have any suitable configuration for creating a strong mechanical lock. The grooves may be cylindrical having a smooth surface contour (FIGS. 4 and 4E-4L) or they may have alternate configurations. For example, the grooves 166m, 166n illustrated in FIGS. 4M and 4N are polygonal including six or eight flats, respectfully. It should be understood that the attachment ends 162-162n and groove configurations 166-166n disclosed herein are merely exemplary and that the stubs 134, 138 may have any suitable attachment end 162 or groove 166 configurations.

Figure 5C:
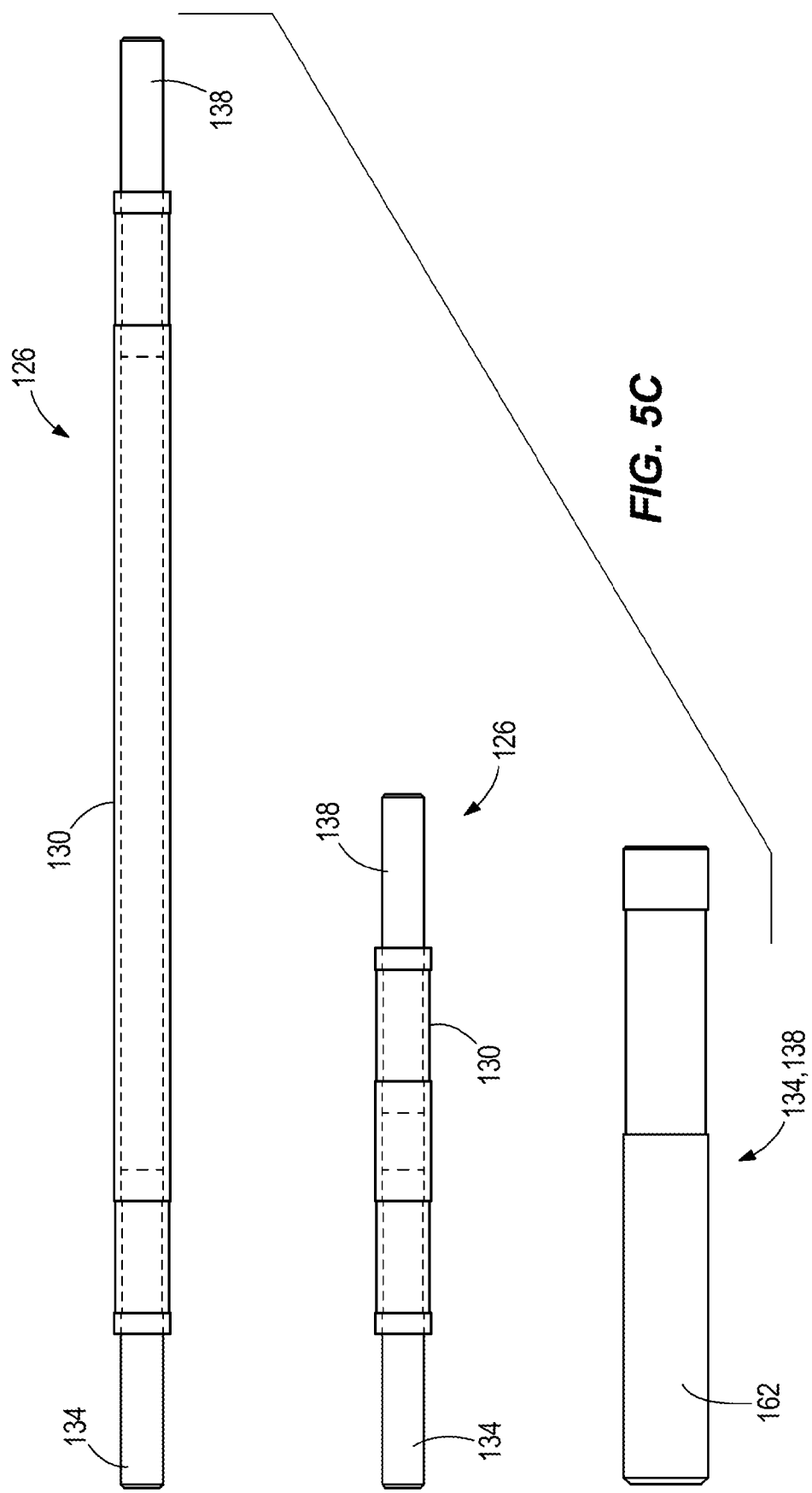
Figure 7:
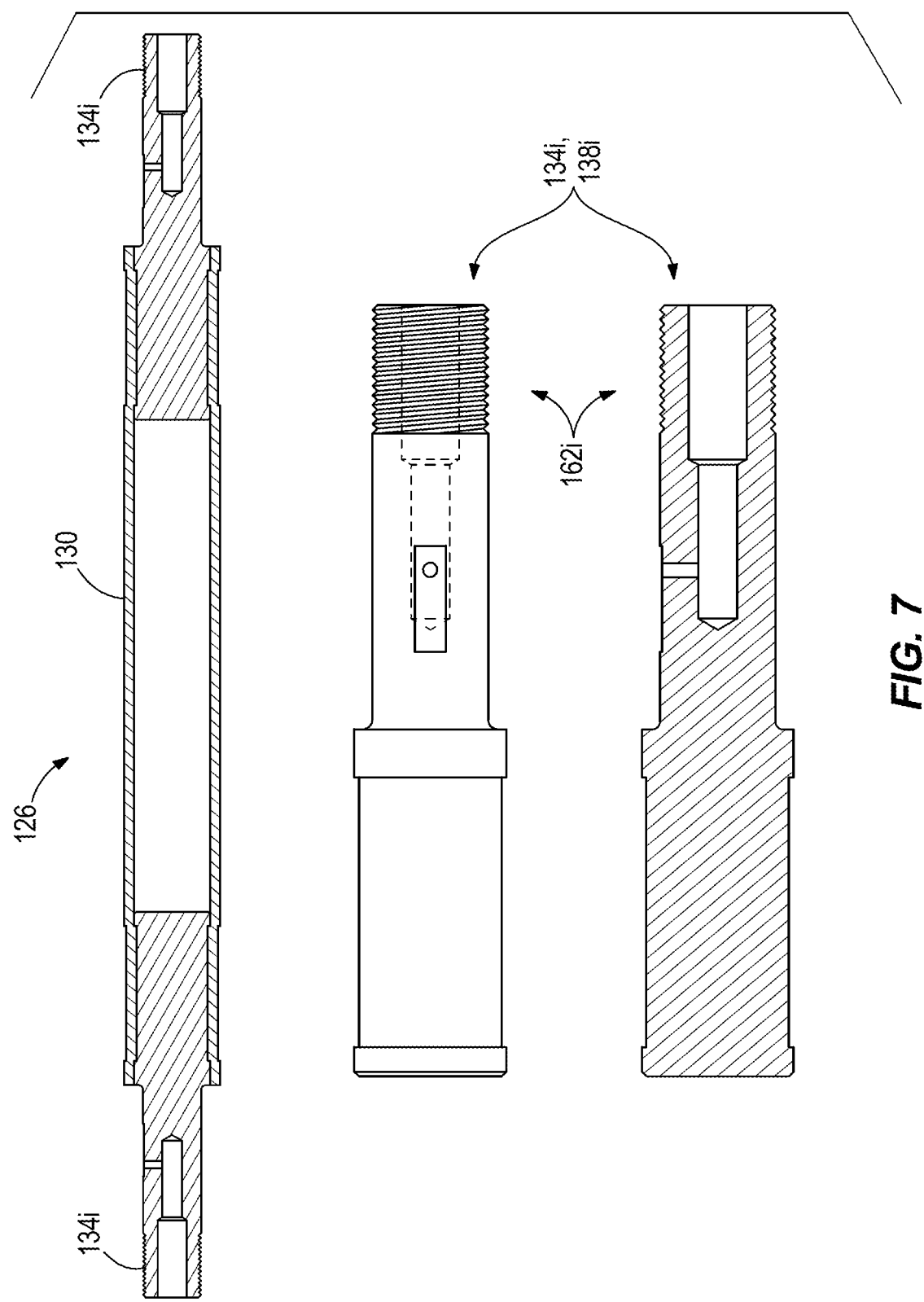
FIG. 7 are side views of the multi-piece shaft illustrating the mechanical interlock between the tube and first and second stubs having another configuration.

Further, FIGS. 5C and 7 illustrate a few of the potential variations that may exist among different types of shafts 126. With reference to FIG. 5C, the tube 130 may be manufactured to have any suitable length. Therefore, when the stubs 134, 138 are secured therein, shafts 126 having a variety of shaft lengths may be easily manufactured. The shafts 126 may have a length in the range of 12 inches to 120 inches. The stub length, the first diameter 158 of the stub 134, 138, and the second diameter 170 of the grooves 166 may also vary depending on the type and length of the shaft being manufactured. In some cases, the length of the stub may be determined by the width of the desired shaft in order to ensure that all of the physical demands of the shaft are met. For example, if a shaft is to have a 60 mm diameter bearing, larger stubs having lengths of approximately 12 inches are necessary to assemble the shaft. The stub length may be in the range of approximately 5 inches to 12 inches, although shorter or longer lengths are contemplated depending upon the desired final shaft length. The tube 130 may be cut to any length to accommodate the length of the stubs 134, 138 and relative to the overall desired length of the shaft 126. Further, with respect to FIG. 7, stubs 134i, 138i (FIG. 4I) having attachment ends 162i with the illustrated configurations are mechanically interlocked with the tube 130 thereby creating the shaft 126 having a unique endpiece configuration. As discussed above, stubs 134, 138 having any attachment end 162 with any attachment configuration may be secured on opposite ends of the tube 130 to create a multi-piece shaft compatible with any idler roller assembly type.

Figure 10:
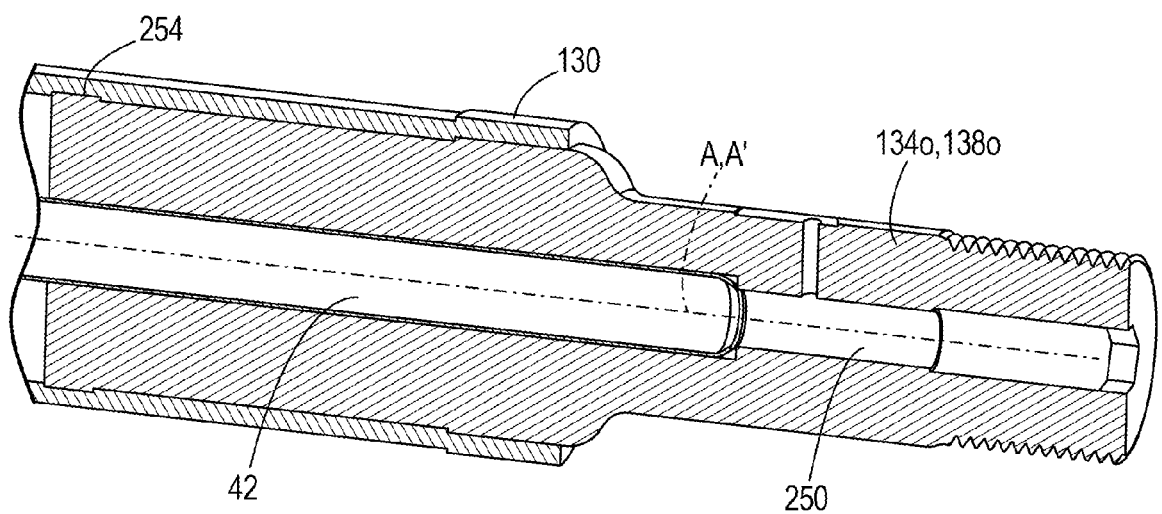
FIG. 10 is a perspective cross-sectional view of an idler roller having grease tubes extending through at least part of the multi-piece shaft and stubs.

Stubs 134o, 138o in other configurations (FIG. 4O) may include a hole or aperture 250 in that extends from an end of the stub 134o, 138o that is received within the tube 130 at least partially through the stub 134, 138. The hole 250 allows at least a portion of the grease tube 42 that extends through the tube 130, which passes grease to lubricate the rollers 14, to be received by the stubs 134o, 138o (FIG. 10). Further, stubs 134, 138 may include a gripping portion 254 including serrations 258 that extend about an outer diameter of the stub 134, 138 (see FIG. 11), the purpose of which will be described in greater detail below.

Figure 8:
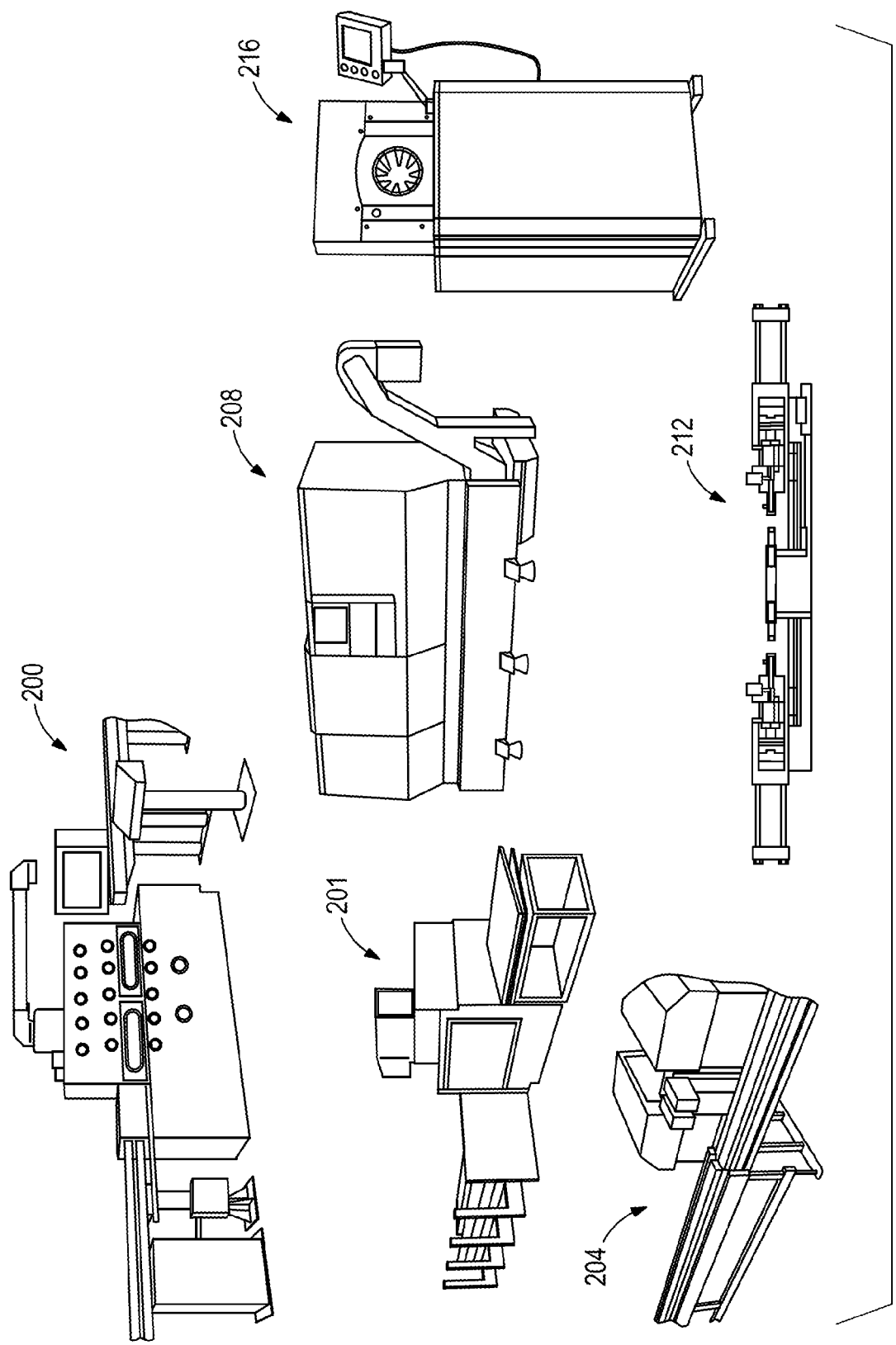
FIG. 8 illustrates a process and corresponding equipment involved in the constructing the multi-piece shaft of FIG. 3, the process including a crimping machine for creating the mechanical interlock.
Figure 9:
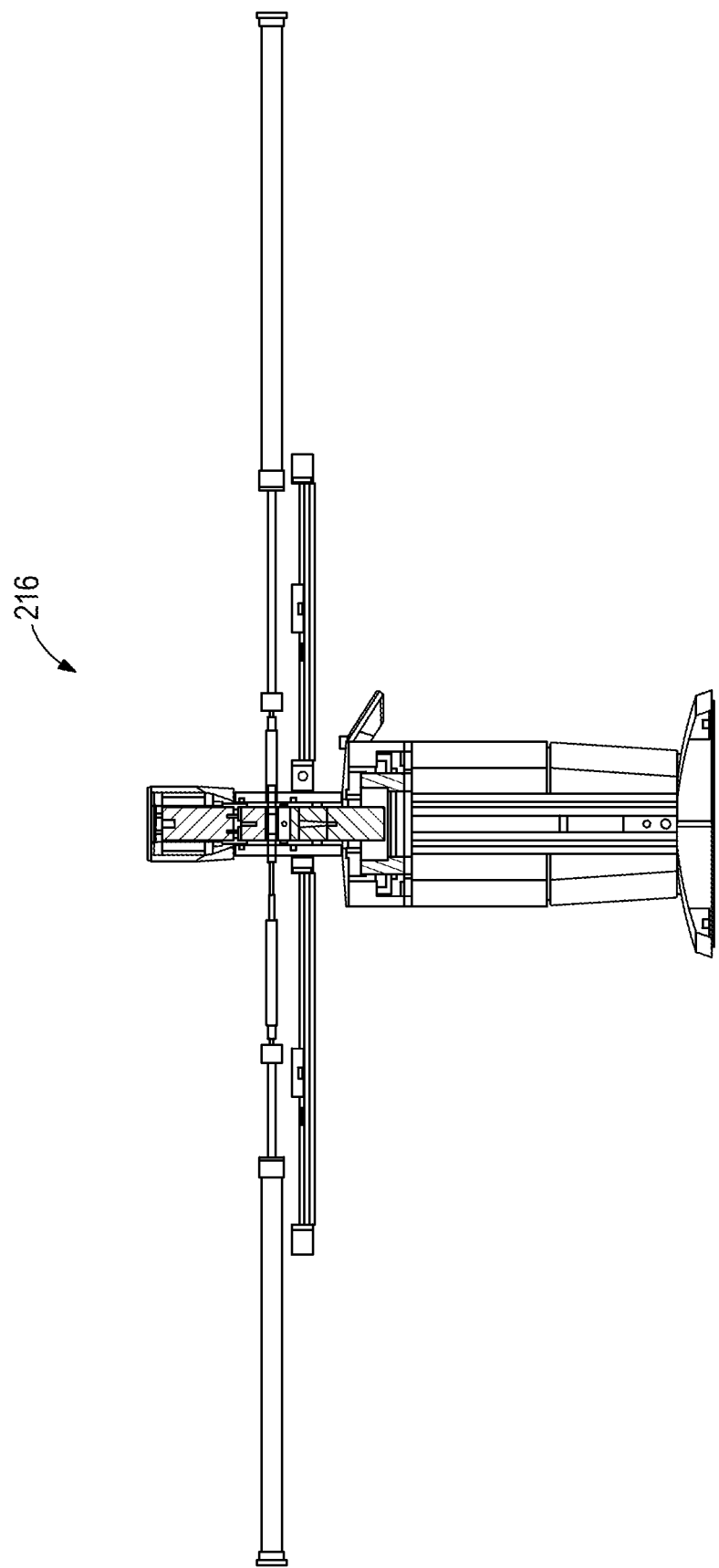
FIG. 9 is an enlarged view of a crimping machine.

The exemplary multi-piece shafts of FIGS. 3, 5A, 5B, 5C, 6, and 7 are manufactured using a process that requires fewer steps and machines than current manufacturing methods. FIGS. 8 and 9 illustrate the machinery used to manufacture the multi-piece shafts 126.

During manufacturing, the tube 130 is first prepared. The tube 130 at a first, initial length typically includes a slight bend or deformation and therefore, the tube 130 must be straightened. The tube 130 is straightened by a computer numerical controlled (CNC) straightener 200. Once the tube is straightened, the tube 130 is cut to an appropriate length using a CNC rotating tool cutoff 201. The CNC cutoff machine 201 is capable of maintaining cut lengths to within +/−0.005 inches overall and also minimizes the chips that are generated during the cut. The tube may have any suitable length or inner and outer diameters. The ends 142, 146 of the tube 130 are chamfered, drilled, and deburred using, for example, a horizontal drill (not shown) and a deburring machine 204, respectively.

Second, each of the stubs 134, 138 is manufactured to include the attachment end 162 with any suitable attachment configuration for use with any idler roller assembly and groove. In the illustrated embodiment, the stubs 134, 138 are constructed using a CNC lathe machine 208 that is configured and tooled to turn, drill, mill, tap, groove, and chamfer the stubs 134, 138 on any of three axes with live tooling to achieve the attachment configuration of the attachment end 162 and the groove 166. In the illustrated embodiment, the stubs 134, 138 have a length of approximately 5.375 inches, although additional embodiments may include stubs that are longer or shorter.

For example, by varying the length of the stubs and maintaining a common length of the tube, multi-piece shafts of varying lengths for a variety of machines and uses may be achieved. In another example, varying the length of the tube and maintaining a common length of the stubs also achieves multi-piece shafts of varying lengths. The unique stub configurations that is illustrated herein includes first and second diameters 158, 170 having any suitable dimension. Additionally, the lengths and sizes of the groove 166 and the flanges 168, 172 on opposite sides thereof are variable. Similarly, the lengths, diameters and the attachment configurations of the attachment ends 162 are merely exemplary and therefore, the attachment configuration may have lengths and diameters having any suitable dimension.

Figure 6:
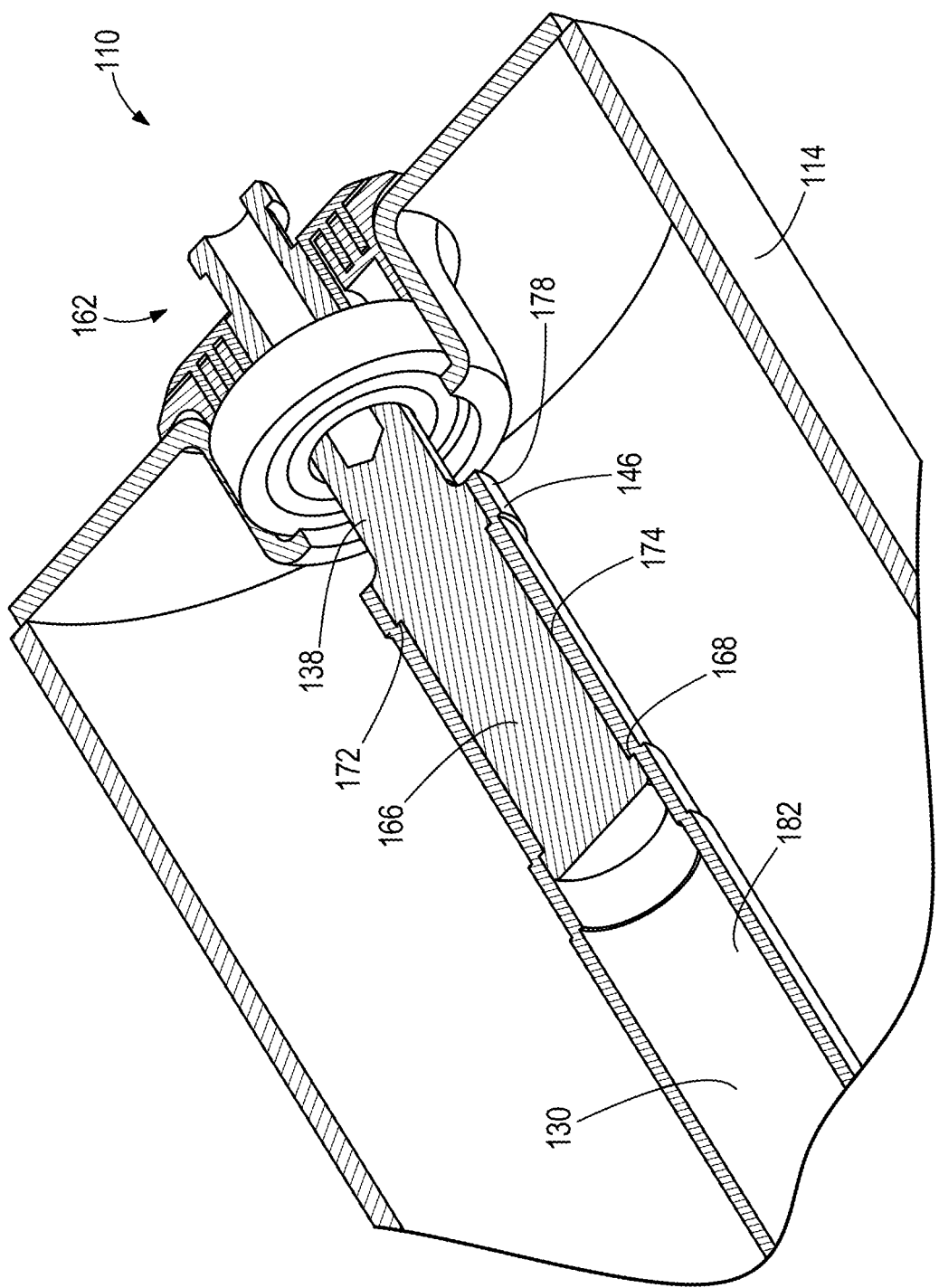
FIG. 6 is a cross-sectional view of an idler roller having a multi-piece shaft extending therethrough.

Once the stubs 134, 138 have been manufactured, the stubs are aligned with and pressed into opposite ends 142, 146 of the tube 130 using a stub pressing machine 212 such that the groove 166 is situated inside the tube 130. At this point the tube 130 and stubs 134, 138, which are unsecured relative to one another, are automatically transferred to a crimping machine 216 that includes a customized handling and positioning fixture. The crimping machine is a standard machine that is capable of crimping shafts having a range of size and therefore, is sized appropriately to the specific the components being crimped. The crimping machine 216 crimps the tube 130 onto the stubs 134, 138 such that a portion 174 of the tube 130 is indented or depressed such that the portion 174 is secured between flanges 168, 172 thereby locking the tube 130 relative to the stubs 134, 138 (FIG. 6). Distal portions 178 of the first and second ends 142, 146 of the tube 130, as well as a central portion 182 of the tube between the stubs 134, 138, retain substantially the original inner diameter 150. The portion 174 defines an intermediate diameter 180 that may have any suitable dimension between approximately the second diameter 170 of the groove 166 and the first diameter 158 of the flanges 168, 172. In the illustrated embodiment, corners of the flanges 168, 172 are sharp to aid in locking the stubs 134, 138 relative to the tube 130. Additionally, the serrations 258 of the gripping portion 254 illustrated in FIG. 11 press against the inner diameter 154 of the tube 130 thereby preventing the stubs 134, 138 from rotating relative to the tube 130 during and after assembly of the shaft 126. Alternative embodiments may include different flange constructions or serrated portions that cover more or other parts of the stubs. The assembled multi-piece shaft 126 may then be set aside to be inserted into a roll during an assembly of the idler roller.

Figure 11:
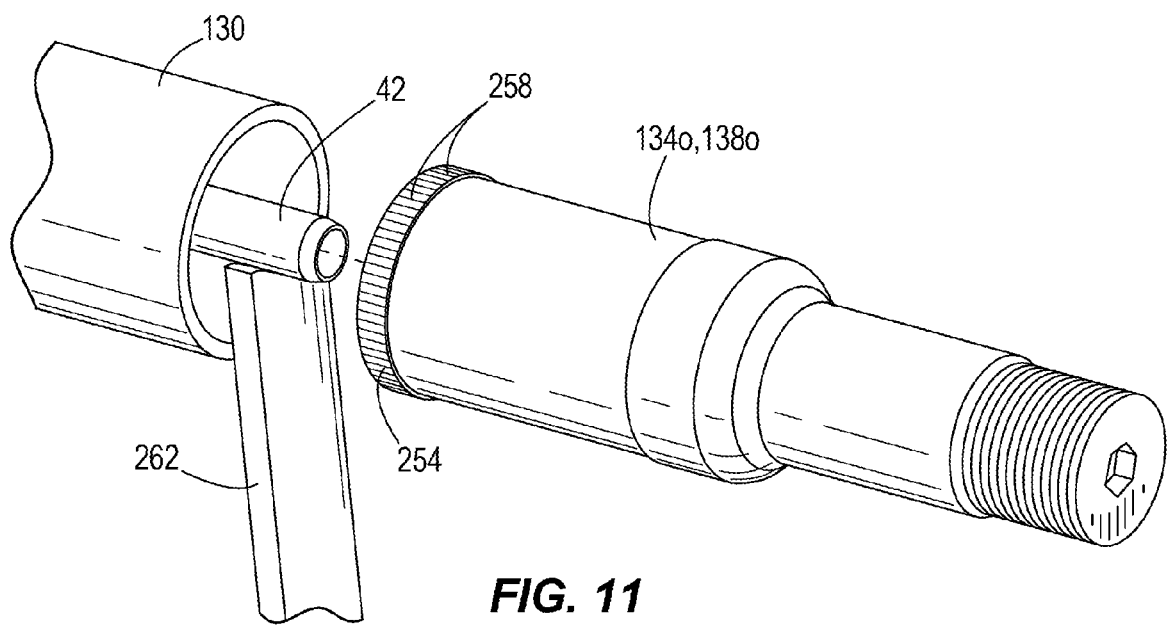
FIG. 11 is an exploded view of an idler roller having grease tubes extending through at least part of the multi-piece shaft and stubs.

With reference to FIGS. 10, and 11, when stubs 134o, 138o having grease-passing holes 250 (FIG. 4O) are used such that at least a portion of the grease tube 42 that extends through the tube 130 is received by the stubs 134o, 138o, there may be an additional step in the manufacturing process described above. In particular, during assembly an alignment mechanism, which in the illustrated embodiment includes at least two supports or lift vees 262, raises the tubing to the centerline axis A'. The centerline axis A' is parallel to a longitudinal axis A of the shaft. Similarly, the stubs 134o, 138o are held in pressing modules (not shown) that are configured to receive the specific type of stub. The lift vees 262 bring all the stubs 134o, 138o together with the tube 130 such that the grease tube 42 is at least partially received in the aperture 250 of the stubs 134o, 138o. When the pressing modules first move toward the tube 130 they are stopped at a controlled point whereby the stub 134o, 138o does not touch the grease tube 42 lift vee 262 on either end. The grease tube 42 has now entered the hole 250 on both stubs 134o, 138o a small distance such that the grease tube 42 extends beyond the lift vees 262. The lift vees 262 now descend leaving the area clear for the modules to continue forward pressing the stubs 134o, 138o into the tube 130 to a prescribed distance. The grease tube 42 is now fully captured between the stubs 134o, 138o with a small gap (i.e., in the range of approximately 0.015 mm-0.030 mm) between the bottom of the hole 250 in the stub 134o, 138o and the end of the grease tube 42. Next, the crimping procedure described above completes the assembly of the shaft 126.

The shaft assembly and method of manufacturing described herein includes advantages over known idler roller shafts. The tube 130 receives and secures stubs 134, 138 having any size or design. Further, as a result of the crimping process, the outer diameter 150 of the shaft 126 may be non-uniform. In other words, the shaft 126 may have a variable outer diameter. Similarly, both the length of the tube and lengths of the stubs may vary. Together, the tube, the first stub, and the second stub define a length of the shaft. Therefore, the method described herein is able to manufacture shafts having different lengths and any type of endpiece configuration. Additionally, because the stubs 134, 138 having any suitable attachment configuration may be coupled to the tube 130, idler roller shafts having any endpiece configuration may be assembled. In other words, idler rollers requiring any length of shaft and any endpiece configuration may be assembled using one method and machinery.

Further, manufacturing unique idler roller assembly shafts is both possible and economically efficient. Using the same process and machinery, a stub, which may have any length, diameter, drilled, cross drilled, not drilled, tapped, slotted, counterbored, reamed or the like before insertion, may be received in the center tube, which has any length, and secured therein by crimping or a mechanical interlock. The fact that a shaft having an endpiece configuration and length is easily manufactured affords the capability of performing maintenance on idler rollers already in use in the field. For example, the shaft of an idler roller may be replaced with a new shaft having the same endpiece configuration. Another advantage of the shaft assembly described herein is that the weight of the shaft is reduced because the tube is hollow, rather than solid. Despite the weight reduction, the strength of the shaft is increased and therefore able to maintain its shape under significant loads. In addition, the weight reduction of the shaft translates to a cost savings. Therefore, the shaft has an increased strength to weight ratio at a reduced cost.

Thus, the invention provides, among other things a multi-piece shaft for use with an idler roller assembly and a process for manufacturing the same. The multi-piece shaft described herein affords the ability to create a shaft having any attachment configuration. Therefore, shafts used in conjunction with any idler roller assembly may be manufactured using the same process. Moreover, the above-described process accommodates manufacturing shafts having any diameter. Therefore, variable diameter shafts that comply with a variety of idler rollers are capable of being manufactured using one process that utilizes all of the same machinery. Because the same machinery and processes are used to manufacture a variety of shafts and that the process requires fewer steps and machines, the cost of manufacturing idler roller shafts is significantly reduced. Further, the disclosed process requires less manual handling, which enhances the safety of employees. The process is stream-lined and therefore, includes less waiting time than conventional manufacturing processes and produces a more consistent product with a smaller margin of error. Additionally, the disclosed multi-piece shaft is manufactured having the same durability and strength as an integrally manufactured shaft. Various features and advantages of the invention are set forth in the following claims.

What is claimed is:

1. A multi-piece shaft for an idler roller comprising:
 a tube extending through the idler roller and having a first end and a second end;
 a first stub secured to the first end of the tube by a mechanical interlock; and
 a second stub secured to the second end of the tube by a mechanical interlock;
 wherein the first stub extends from the first end and the second stub extends from the second end when secured to the tube such that the tube, the first stub and the second stub define a length of the shaft;
 wherein the tube is mechanically crimped to each of the first stub and the second stub.

2. The multi-piece shaft of claim 1, wherein each of the first stub and the second stub includes a groove and an attachment configuration.

3. The multi-piece shaft of claim 2, wherein each of the first stub and the second stub define a first diameter and the grooves of each of the first stub and the second stub define a second diameter.

4. The multi-piece shaft of claim 2, wherein when secured to the tube, the groove of each of the first stub and the second stub is received within the tube.

5. The multi-piece shaft of claim 2, wherein when secured to the tube, the tube is depressed in an area of the grooves of each of the first stub and the second stub such that a diameter of the tube in the area of grooves is substantially equal to a second diameter of the grooves.

6. The multi-piece shaft of claim 2, wherein a length of the stub, a first diameter of the stub and a second diameter of the groove depend on a length and an inner diameter of the tube.

7. The multi-piece shaft of claim 2, wherein when secured to the tube, the attachment configuration of each of the first stub and the second stub projects from the tube.

8. The multi-piece shaft of claim 1, wherein the first stub and the second stub are substantially identical.

9. A multi-piece shaft for an idler roller comprising:
 a tube extending through the idler roller and having a first end and a second end;
 a first stub and a second stub, each of the first stub and the second stub define a first diameter and include a groove and an attachment configuration, the groove defining a second diameter;
 wherein the first stub is received in one of the first end or the second end of the tube and the second stub is received in the other of the first end or the second end of the tube;
 wherein each of the first stub and the second stub are secured to the tube by depressing the tube in an area of the grooves of the first stub and the second stub such that at least a portion of a diameter of the tube becomes substantially equal to the second diameter of the grooves.

10. The multi-piece shaft of claim 9, wherein the first stub and the second stub are substantially identical.

11. The multi-piece shaft of claim 9, wherein the tube is mechanically crimped to each of the first stub and the second stub.

12. The multi-piece shaft of claim 9, wherein a length of the stub, the first diameter of the stub and the second diameter of the groove depends on a length and an inner diameter of the tube.

13. The multi-piece shaft of claim 9, wherein the shaft is non-uniform.

14. An idler roller assembly comprising:
 a frame;
 a plurality of rollers supported by the frame; and
 a multi-piece shaft extending through each of the rollers, the multi-piece shaft including:
  a first stub secured to the first end of the tube by a mechanical interlock; and
  a second stub secured to the second end of the tube by a mechanical interlock;
  wherein the first stub extends from the first end and the second stub extends from the second end when secured to the tube such that the tube, the first stub and the second stub define a length of the shaft;
  wherein the tube is mechanically crimped to each of the first stub and the second stub.

15. The idler roller assembly of claim 14, wherein each of the first stub and the second stub defines a first diameter and the grooves of each of the first stub and the second stub define a second diameter.

16. The idler roller assembly of claim 15, wherein a length of the stub, the first diameter of the stub and the second diameter of the groove depends on a length and an inner diameter of the tube.

17. The idler roller assembly of claim 14, wherein an outer diameter of the shaft is variable.

18. The idler roller assembly of claim 14, wherein the multi-piece shaft of each roller is interconnected by flexible tubes that allow grease to pass for lubricating the rollers.

* * * * *